United States Patent [19]
Itoh et al.

[11] Patent Number: 6,115,515
[45] Date of Patent: Sep. 5, 2000

[54] OPTICAL DEVICE MOUNTING BOARD

[75] Inventors: Masataka Itoh; Junichi Sasaki, both of Tokyo, Japan

[73] Assignee: NEC Corporation, Tokyo, Japan

[21] Appl. No.: 09/154,714

[22] Filed: Sep. 17, 1998

[30]     Foreign Application Priority Data

Sep. 19, 1907 [JP] Japan ................................... 9-255003

[51] Int. Cl.$^7$ .................................................. G02B 6/12
[52] U.S. Cl. ................................ 385/14; 385/2; 385/4
[58] Field of Search .................... 385/14, 2, 4, 8

[56]          References Cited

U.S. PATENT DOCUMENTS

| | | | |
|---|---|---|---|
| 5,625,734 | 4/1997 | Thomas et al. | 385/88 |
| 5,835,646 | 11/1998 | Yoshimura et al. | 385/14 |

FOREIGN PATENT DOCUMENTS

| | | |
|---|---|---|
| 0 636 912 | 2/1995 | European Pat. Off. . |
| 61-207092 | 9/1986 | Japan . |
| 4-219737 | 8/1992 | Japan . |
| 5-259632 | 10/1993 | Japan . |
| 5-79971 | 10/1993 | Japan . |
| 6-69640 | 3/1994 | Japan . |
| 6-275870 | 9/1994 | Japan . |
| 8-78657 | 3/1996 | Japan . |
| 9-26530 | 1/1997 | Japan . |

OTHER PUBLICATIONS

S. Mino et al., "A 10 Gb/s Hybrid–Integrated Receiver Array Module Using a Planar Lightwave Circuit (PLC) Platform Including a Novel Assembly Region Structure", pp. 2474–2482, Journal of Lightwave Technology, vol. 14, No. 11, Nov. 1996.

H. Karstensen et al., "Short Distance 8–Channel Parallel Optical Link for Data Communications", pp. 83–87, IEEE, May 18, 1992.

*Primary Examiner*—Phan T. H. Palmer
*Attorney, Agent, or Firm*—Young & Thompson

[57]            ABSTRACT

An optical device mounting board with electrodes mounted on the surface of the mounting board and separated from one another by grooves dividing the surface of the mounting board includes printed circuit boards having distribution lines for connecting the divided electrodes and spanning the grooves.

18 Claims, 6 Drawing Sheets

OPTICAL DEVICE MOUNTING BOARD

BACKGROUND OF THE INVENTION

1. Technical Field of the Invention

The present invention relates to an optical device mounting board which mounts optical modules for transmitting and receiving optical communication signals.

2. Description of the Prior Art

Application fields of optical communication have been extended by virtue of the improvement and diversification of passive or active devices such as optical fiber, semiconductor laser, light emitting diode, photodiode, optical switch, optical modulator, isolator, and optical wave guide. Recently, the research is extending particularly to hybrid optical integrated circuits wherein a plurality of optical devices or components such as laser diode, semiconductor optical amplifier, optical fiber, and optical waveguide are mounted on a single mounting board.

At first, a conventional optical device mounting board is explained, referring to an example of an optical device mounting board including a semiconductor amplifier array module. The conventional optical device mounting board is shown in the plan view of FIG. 5, while its cross sectional view is shown in FIG. 6.

The conventional optical device mounting board 110 as shown in FIGS. 5 and 6 comprises four channel semiconductor optical amplifier (SOA) array 103, four input optical fibers 102a for the input of SOA array 103, four output optical fibers 104a for the output from SOA array 103, and silicon (Si) mounting substrate 101 which mounts these optical devices or components.

Fiber array 102 as shown in FIG. 5 is composed of four input optical fibers 102a, while fiber array 104 is composed of four output optical fibers 104a. Further, each edge 103a of SOA array 103 is connected with the edge of optical fiber 102a, or 104a. Therefore, electrode 106 for SOA array 103 is extended from each side 103b of SOA array 103 on Si mounting substrate 101. Electrode 106 is connected with electrode pad 109 which is positioned near the edge of Si mounting substrate 101. Further, electrode pad 109 is connected by using such means as bonding wires with electrode pads (not shown) for an external circuit (not shown).

V-shaped groove 107 is provided on Si mounting substrate 101 to fix optical fibers 102a and 104a. Further, square groove 105 is provided at the end of V-shaped groove 107 to bump the ends of optical fibers 102a and 104a and adjust their optical axis. SOA array 103 is fixed by solder bump 108 on Si mounting substrate.

According to the above-mentioned optical device mounting board 110, optical signals inputted into SOA array 103 through input optical fiber array 102 are amplified by SOA array 103, and outputted to the outside through output fiber array 204.

An integration of a plurality of SOA array modules as shown in FIGS. 5 and 6 is also known. Such a conventional integration is shown in the plan view of FIG. 7.

Optical device mounting board 209 as shown in FIG. 7 comprises Si mounting substrate 201, input optical fiber array 202, SOA array 203, and output optical fiber array 204. Optical device mounting board 209 is similar to optical device mounting board 110.

The electrode connected with SOA array 203 is extracted from outer side 203a of SOA array 203. Concretely, outer electrode 206 is connected with electrode pad 208a positioned at the edge of Si mounting substrate 201. Internal electrodes 207a, 207b and 207c are extracted from internal side 203b of SOA array 203, and connected with electrode pad 208b positioned at the edge of Si mounting substrate 201.

Internal electrode 207a is divided from internal electrode 207b at square groove 205, while internal electrode 207b is divided from internal electrode 207c at V-shaped groove not shown in FIG. 7. Therefore, internal electrodes 207a, 207b and 207c are connected with each other by connecting means such as bonding wires.

Another example of conventional optical device mounting board is shown in the plan view of FIG. 8.

Optical device mounting board 309 as shown in FIG. 8 includes 1×4 optical waveguide 302 instead of input optical fiber array 102 as shown in FIG. 5 as the corresponding optical component for inputting an optical signal into SOA array 103. A plurality of 1×4 optical waveguides 302 and SOA array modules are hybrid-integrated on Si mounting substrate 301.

Optical device mounting board 309 as shown in FIG. 8 comprises Si mounting substrate 301, 1×4 optical waveguides 302, SOA array 303, and output optical fiber array 304. Optical device mounting board 309 is similar to optical device mounting boards 110 and 209.

Internal electrode 307a is divided from internal electrode 307b at square groove 305, while internal electrode 307b is divided from internal electrode 307c at V-shaped groove not shown in FIG. 8. Therefore, internal electrodes 307a, 307b and 307c are connected with each other by connecting means such as bonding wires.

These conventional optical device mounting boards 110, 209 and 309 are high performance, compact and low cost hybrid optical integrated circuits, because a plurality of optical devices are mounted on a single substrate.

As explained above, the internal electrodes are divided by the square grooves and V-shaped grooves, because there are provided one or more than one square grooves, V-shaped grooves, optical waveguides, and semiconductor optical amplifiers on the optical device mounting board. Therefore, the internal electrodes are connected with each other by connecting means such as bonding wires.

However, short circuits may occur between the wires connecting the internal electrodes, and some wires may break. Thereby, the optical device mounting board loses its reliability. Further, the productivity of the board is lowered, because many wires must be bonded at the division points.

SUMMARY OF THE INVENTION

Therefore, an object of the present invention is to improve the reliability and productivity of an optical device mounting board.

In accordance with the present invention, there is provided an optical device mounting board, wherein extraction electrodes which are divided by square grooves or V-shaped grooves for optical fibers are connected by distribution lines formed on a printed circuit board which is mounted on the optical device mounting board.

The reliability of the optical device mounting board of the present invention can be improved, because there is no danger of short circuit due to the contact of wires. This is one of the advantages, as compared to connect the divided extraction electrodes individually with bonding wires. The productivity of the optical device mounting board of the present invention can be improved, because all the distribution lines are simultaneously connected to all the extraction electrodes in a single soldering step.

Further, wiring design can be complied with high frequency signals, because micro strip lines can be formed on multiple layer printed circuit boards.

Further, high frequency signals can be handled with low noise and low cross talk by mounting electric devices on printed circuit boards with shorter wires.

Also, the quality of high frequency signals is improved and the assembling steps of optical device mounting board is reduced by forming electric circuits on the printed circuit boards.

Furthermore, the printed circuit boards can be mounted by solder bumps in spite of the presence of projecting objects on the optical device mounting board and thereby, the positioning steps for printed circuit boards can be reduced. Also, optical devices and printed circuit boards can be simultaneously bonded to the optical device mounting board and thereby, the assembling steps are reduced, when the same material is used for solder bump.

Further, the assembling steps are simplified, when the reflow step for optical devices and the reflow step for printed circuit boards are separated by using the different materials for solder bumps.

In addition, when solder bumps are made by punching, the soldering character becomes uniform, whereby a high precision positioning is realized.

PREFERRED EMBODIMENT OF THE INVENTION

Figure 1:
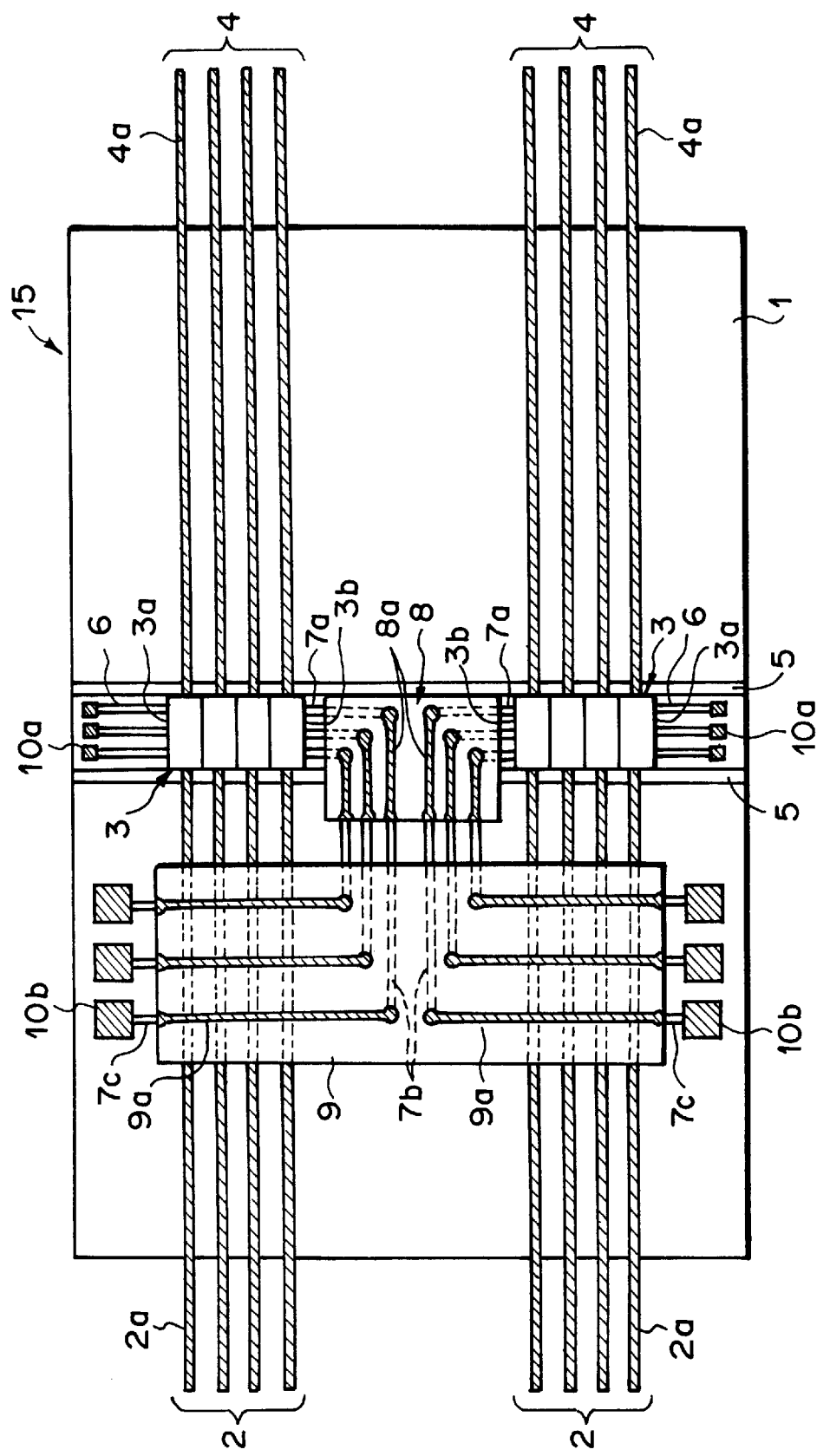
FIG. 1 is a plan view of an optical device mounting board of the present invention.

Referring to the drawings, preferred embodiments of the present invention are explained.

An optical device mounting board in an embodiment of the present invention is shown in the plan view of FIG. 1. Further, its cross sectional view is shown in FIG. 2.

Figure 7:
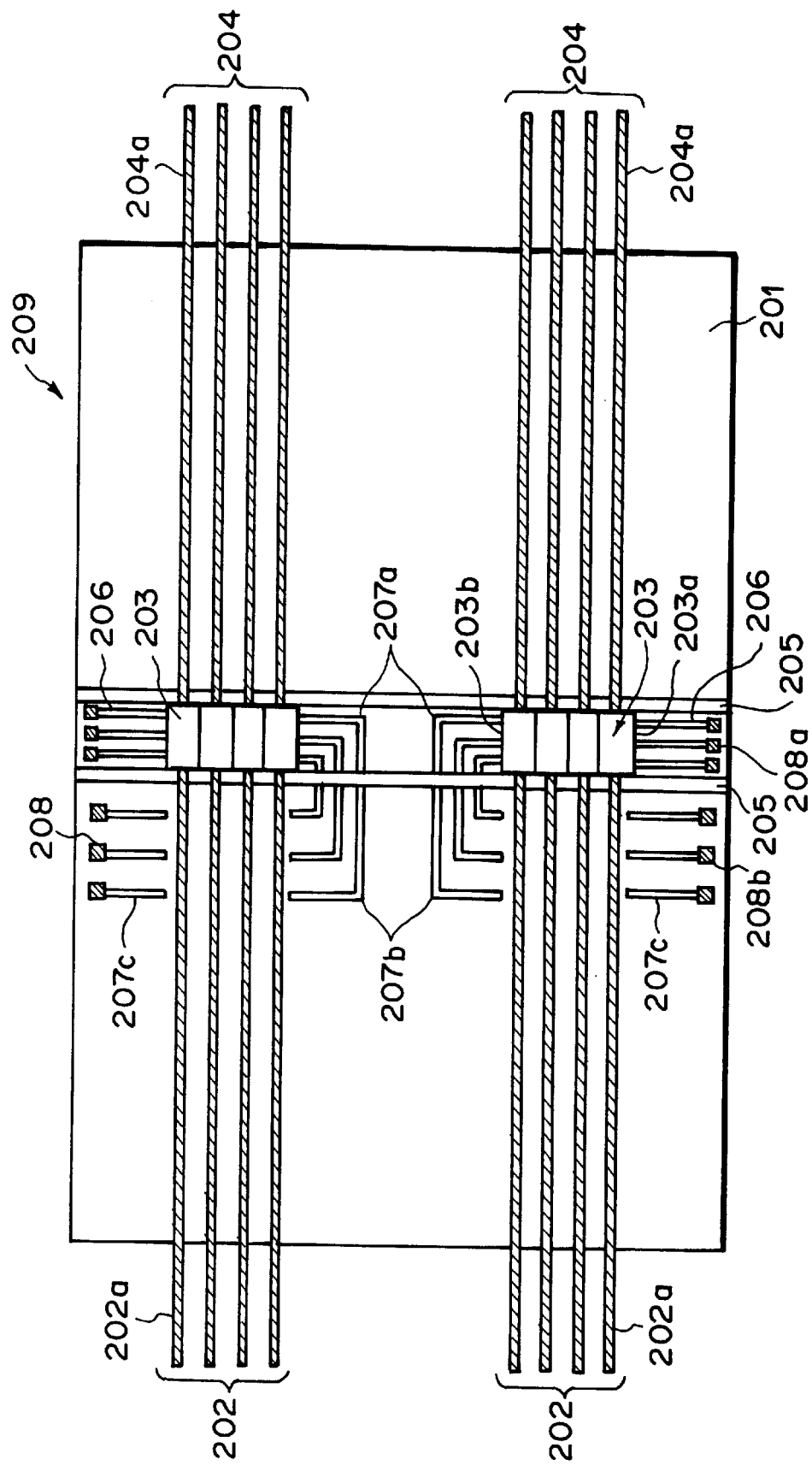
FIG. 7 is a plan view of a conventional optical device mounting board which comprises a plurality of semiconductor optical amplifier array modules as shown in FIGS. 5 and 6.
Figure 8:
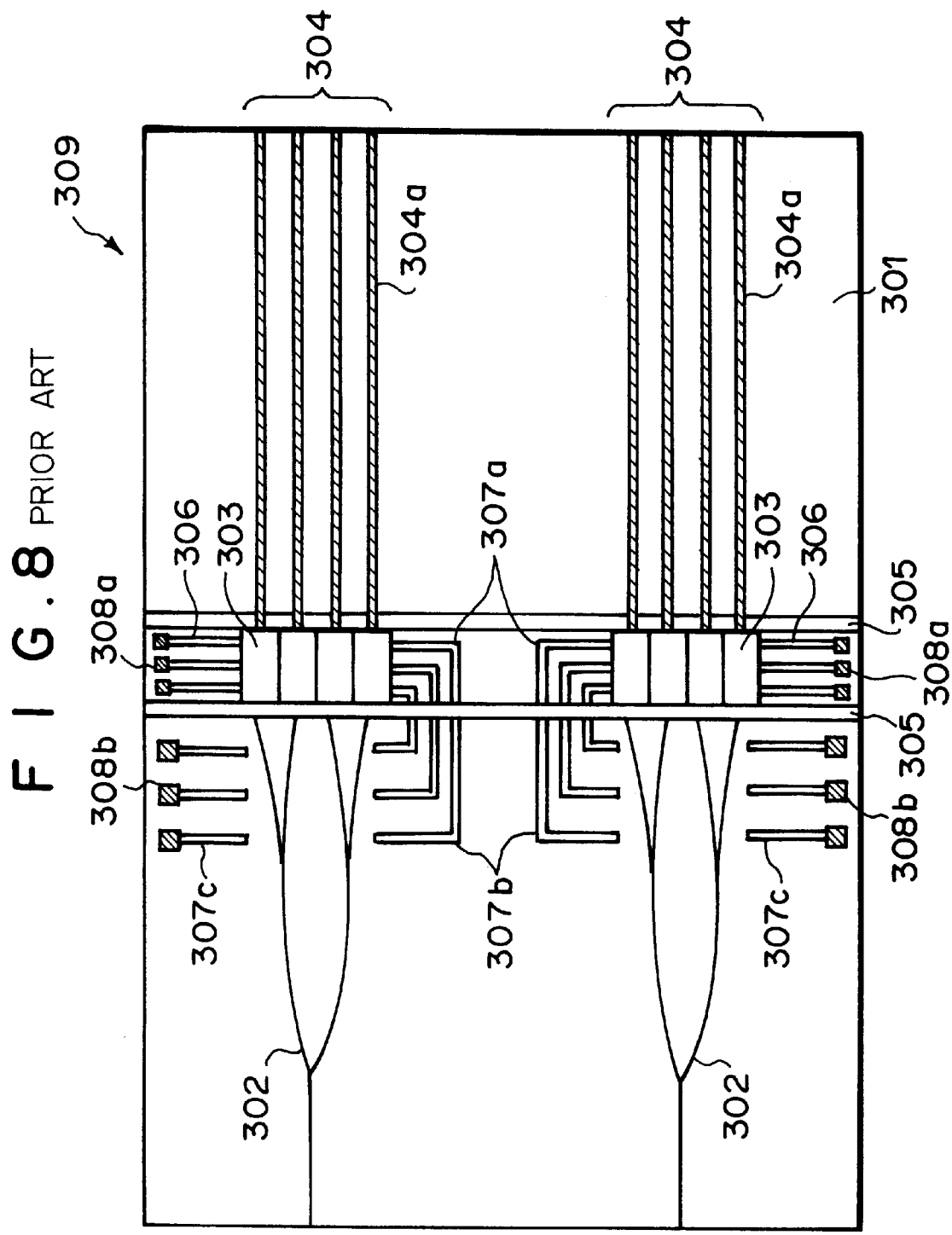
FIG. 8 is a plan view of another conventional optical device mounting board.

The components of optical device mounting board 15 such as Si mounting substrate 1, input optical fiber array 2, input optical fiber 2a, semiconductor optical amplifier array 3, output fiber array 4, output optical fiber 4a, square groove 5, outside electrode 6, internal electrodes 7a,7b and 7c, solder bump 13, and V-shaped groove 14 are the same as those shown in FIGS. 7 and 8. In the following, only the differences from the conventional board are explained. The distribution lines 8a in a first printed circuit board 8 and the distribution lines 9a in a second printed circuit board 9 are shown by solid lines to distinguish them from internal electrodes 7a and 7b, and input optical fiber 2a.

On optical device mounting board 15 as shown in FIG. 1, internal electrode 7a is connected through first printed circuit board 8 with internal electrode 7b which is divided by square groove 5. Here, first printed circuit board 8 has distribution lines 8a printed on a substrate such as glass, or ceramics. First printed circuit board 8 bridging over square groove 5 is bonded on Si mounting substrate 1. The ends of distribution lines 8a are connected with internal electrodes 7a and 7b by solder bumps 12 as shown in FIG. 2.

Figure 2:
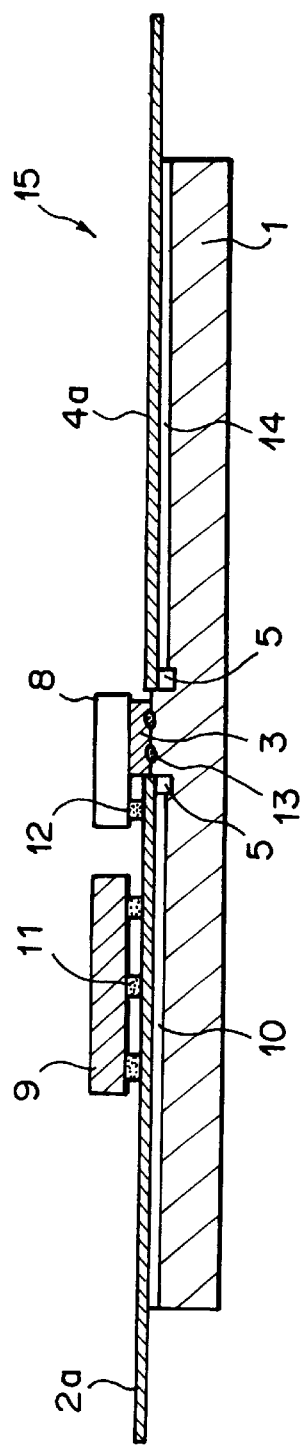
FIG. 2 is a cross sectional view of the optical device mounting board as shown in FIG. 1.

Further, internal electrode 7b is connected through second printed circuit board 9 with internal electrode 7c which is divided by V-shaped groove 14 as shown in FIG. 2. Second printed circuit board 9 also has distribution lines 9a printed on a substrate such as glass, or ceramics. Second printed circuit board 9 bridges over V-shaped groove 14 bonded on Si mounting substrate 1. The ends of distribution lines 9a are connected with internal electrodes 7b and 7c by solder bump 11 as shown in FIG. 2. Here, V-shaped groove 14 is formed by using selective anisotropic etching of KOH.

Thus, the internal electrodes divided by square groove 5 and V-shaped groove 14 are connected three-dimensionally with each other by positioning first printed circuit board 8 and second printed circuit board 9 both of which bridge over the divided portions. Thereby, the reliability of optical device mounting board 15 is improved, because distribution lines 8a and 9a never contact with each other. Further the productivity of optical device mounting board 15 is improved, because a plurality of distribution lines 8a and 9a can be connected with a plurality of internal electrodes by using only one soldering step.

The improvement of productivity and reduction of cost are expected more by using solder bumps rather than by using solder sheets or conductive resin. Further, printed circuit boards 8 and 9 can bridge over a projecting object such as input optical fiber 2a, because the height of solder bumps 11 and 12 can be controlled so that printed circuit boards 8 and 9 is positioned at the height of, for example, 10 $\mu$m to 100 $\mu$m from the surface of Si mounting substrate. Furthermore, solder bumps 11 and 12 perform self alignment effect, when melting. Therefore, the positioning process becomes easier, because printed circuit boards 8 and 9 are mounted with the precision of $\mu$m level after reflow connection, even when printed circuit boards 8 and 9 are positioned roughly on Si mounting substrate 1.

The reflow connection process becomes far more easier, if the material of solder bump 13 for connecting semiconductor optical amplifier array 3 is the same as that of solder bumps 11 and 12. On the contrary, the materials may be different to comply with a high accuracy of reflow connection for an optical device such as optical semiconductor amplifier array 3 and with a moderate accuracy of reflow connections for printed circuit boards 8 and 9. The fabrication process is simplified by using different solders as mentioned above, although the fabrication steps are increased. Regardless of whether the material is the same or not, the production yield is improved, when optical devices to be mounted are increased in number.

Solder bumps 11, 12 and 13 may be fabricated by punching to assure the uniformity of bumps which is necessary for high accuracy positioning of the optical devices. The exchange of the bump materials is merely necessary in the punching method, while a plurality of steps such as vacuum processes, photolithographic processes and plating processes are required, if the punching method is not employed.

Printed circuit boards 8 and 9 may be multi layer boards where each layer has distribution lines, whereby micro strip lines can be formed to comply with high frequency signals as well as to improve electric characteristics such as a cross talk between the distribution lines.

Figure 3:
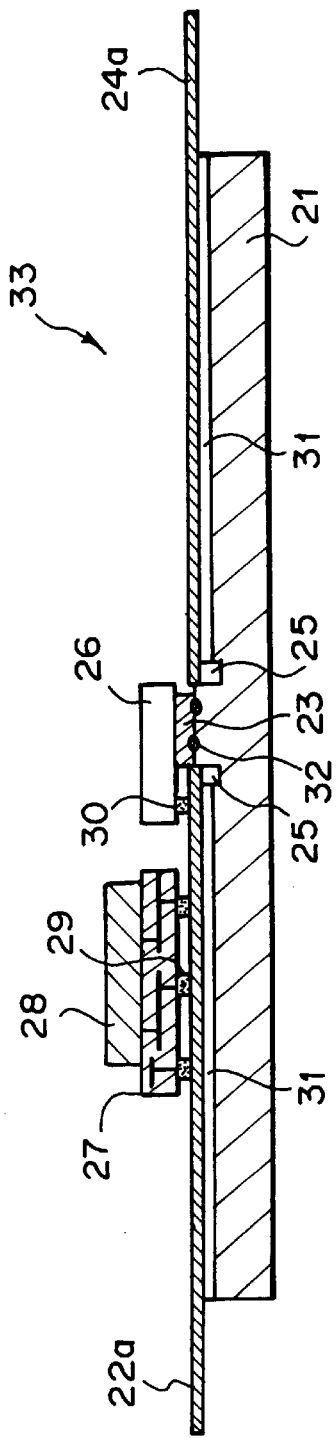
FIG. 3 is a cross sectional view of a variation of the optical device mounting board as shown in FIG. 1.

A variation of optical device mounting board 15 as shown in FIG. 1 is illustrated in FIG. 3.

Second printed circuit board 27 mounted on optical device mounting board 33 is a multi layer board, on which electric devices 28 such as drivers and preamplifiers to control optical devices are mounted. The components of optical device mounting board 33, such as Si mounting substrate 21, input optical fiber array (not shown), input optical fiber 22a, semiconductor optical amplifier array 23, output fiber array (not shown), output optical fiber 24a, square groove 25, first printed circuit board 26, solder bumps 29,30 and 32, and internal electrodes are the same as those shown in FIGS. 1 and 2. It becomes possible to handle high frequency signals with low noise and low cross talk, because the length of the distribution lines in optical device mounting board 33 can be shortened by mounting electric device 28 on second printed circuit board 27.

In place of electric devices 28 mentioned above, electric circuit such as LSI for controlling optical device may be unified with first printed circuit board, whereby the quality of high frequency signals can be improved. Further, the mounting steps of optical device mounting board 33 can be greatly reduced, because it is not necessary to locate electric devices at the peripheral portion of the printed circuits, or the optical device mounting board, or any other board.

Figure 4:
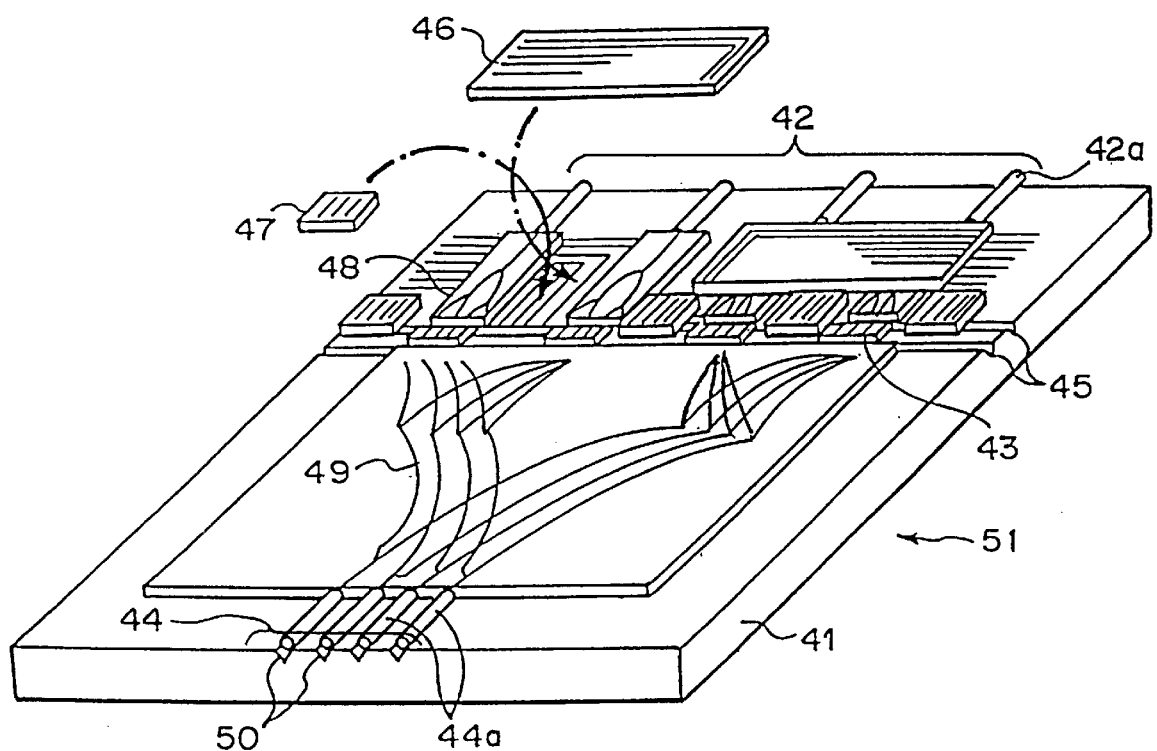
FIG. 4 is a perspective illustration of another variation of the optical device mounting board as shown in FIG. 1.
Figure 5:
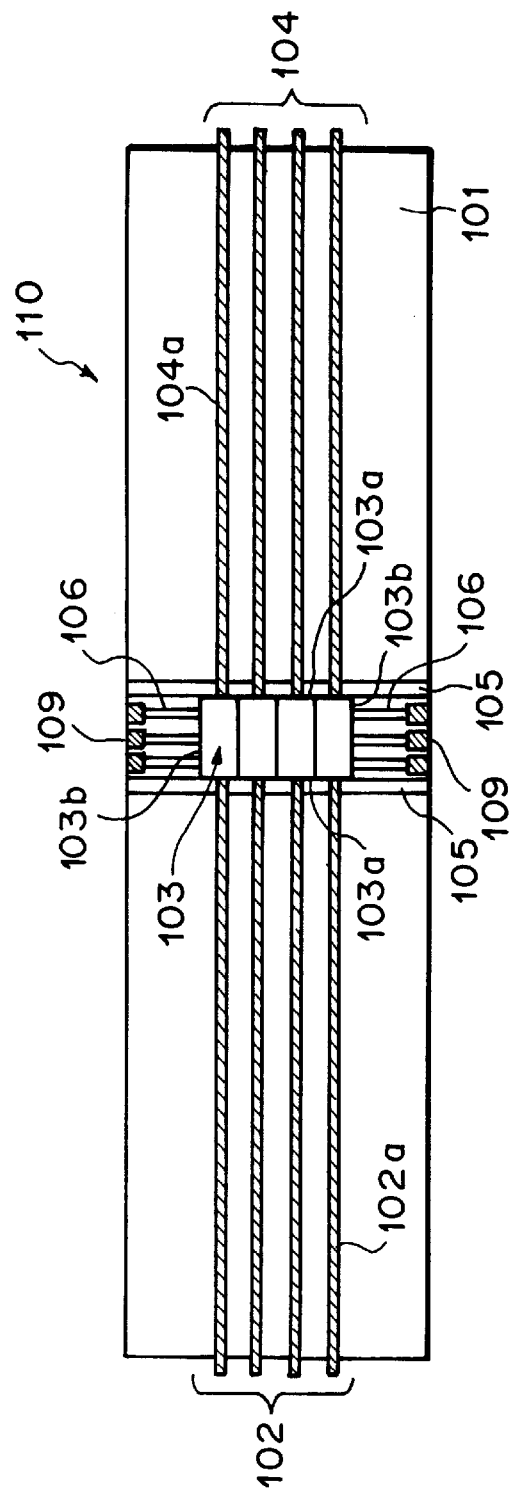
FIG. 5 is a plan view of a conventional optical device mounting board.
Figure 6:
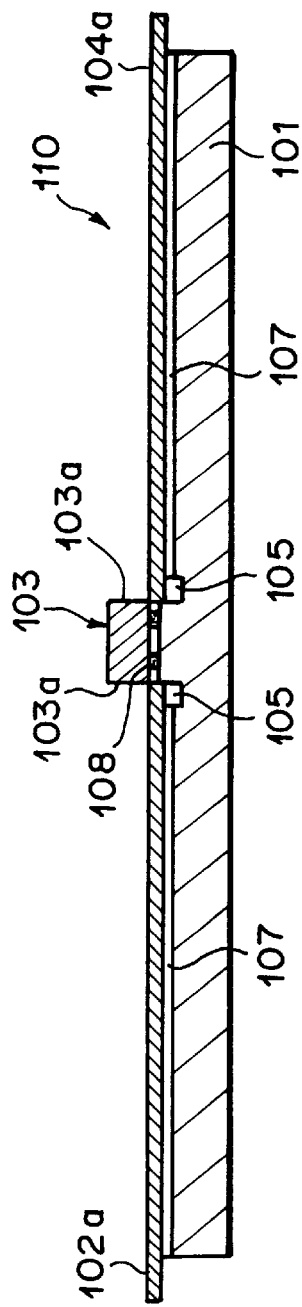
FIG. 6 is a cross sectional view of the conventional optical device mounting board as shown in FIG. 5.

Another variation of optical device mounting board 15 as shown in FIG. 1 is illustrated in FIG. 4.

There are mounted on Si mounting substrate 41 of optical device mounting board 51 as shown in FIG. 4, four 4-channel semiconductor optical amplifier arrays 43 (SOA array 43), four input optical fibers 42a for inputting optical signals into SOA array 43 and four output optical fibers 44a for transmitting optical signals from SOA array 43. Input optical fiber array 42 is composed of four input optical fibers 42a, while output optical fiber array 44 is composed of four output optical fibers 44a.

Further, there is provided, between each input optical fiber 42a and each SOA array 43, 1×4 Y branch optical waveguide 48 which divides the input optical signal inputted from input optical fiber 42a into four optical signals. Further, there is provided, between each output optical fiber 44a and each SOA array 43, 16×4 optical multiplexing waveguide 49 which multiplexes the optical signals outputted from each SOA array 43 and inputs the multiplexed optical signals into output optical fiber 44a. On Si mounting substrate 41, there is provided an semiconductor optical amplifier array module including a hybrid integration of 4×4 optical switch.

The extraction electrodes which is to be connected with SOA array 43 are divided by square groove 45 and Y branch optical waveguide 48 on optical device mounting board 51. Therefore, the electrodes divided by square groove 45 are connected to distribution line chip 47, and the electrodes divided by Y branch optical waveguide 48 are connected to printed circuit board 46. Distribution line chip 47 and printed circuit board 46 bridging over the divided portions of square groove 45 and Y branch optical waveguide 48 are bonded by the solder bumps (not shown) which are mounted on Si mounting substrate 41 to connect the ends of the distribution lines with the electrodes, as in case of printed circuit boards 8 and 9 as shown in FIGS. 1 and 2.

Thus, the divided electrodes can be connected three-dimensionally by using distribution line chip and printed circuit board, also in case of optical waveguide as a component for transmitting optical signals. Therefore, the reliability and productivity of optical device mounting board 51 is improved, as in case of optical device mounting board 15 as shown in FIG. 1 and optical device mounting board 33 as shown in FIG. 3.

Such a device as semiconductor laser may be mounted on the optical device mounting board, although only semiconductor optical amplifier, optical fiber and optical waveguide are exemplified.

Also, arbitrary number of semiconductor optical amplifiers may be employed.

Further, the printed circuit board may be provided not only with distribution wires, but also with printed electronic parts such as resistors, capacitors and coils. Further, a plurality of printed circuit boards may be used.

Further, in place of the printed circuit board, there may be provided one or more integrated circuit substrates which have terminals thereon for connecting above-mentioned electrodes with each other and have also integrated circuits thereon for controlling the optical devices. Furthermore, in place of the printed circuit board, there may also be provided one or more integrated circuit packages which have pins for connecting above-mentioned electrodes with each other and have also integrated circuits therein for controlling the optical devices.

Furthermore, various substrate material other than Si, glass, or ceramics may be employed.

Although the present invention has been shown and described with respect to the best mode embodiment thereof, it should be understood by those skilled in the art that the foregoing and various other changes, omissions, and additions in the form and detail thereof may be made therein without departing from the spirit and scope of the present invention.

What is claimed is:

1. An optical device mounting board which includes electrodes for connecting optical devices, wherein:

said electrodes are mounted on the surface of said optical device mounting board and are divided by grooves having an exposed upper surface, said grooves dividing the surface of said optical device mounting board; and one or more printed circuit boards having distribution lines and/or printed electronic elements for connecting said divided electrodes with each other are mounted on said optical device mounting board and are spanning said grooves.

2. The optical device mounting board according to claim 1, wherein said printed circuit boards are bonded with said optical device mounting board by solder bumps.

3. The optical device mounting board according to claim 2, wherein optical devices are bonded with said optical device mounting board by using solder bumps of the same material as the material for said solder bumps for bonding said printed circuit boards and said optical device mounting board.

4. The optical device mounting board according to claim 2, wherein optical devices are bonded with said optical device mounting board by using solder bumps of the melting point different from that of said solider bumps for bonding said printed circuit boards and said optical device mounting board.

5. The optical device mounting board according to claim 2, wherein said solder bumps are manufactured by punching a board made of a material thereof.

6. The optical device mounting board according to claim 1, wherein said printed circuit boards are multiple layer board having a plurality of layers each of which has a plurality of distribution lines and/or printed electronic elements.

7. The optical device mounting board according to claim 1, wherein electronic devices for controlling said optical devices are mounted on said printed circuit boards.

8. The optical device mounting board according to claim 1, wherein electronic circuits for controlling said optical devices are mounted on said printed circuit boards.

9. An optical device mounting board which includes electrodes for connecting optical devices, wherein:

said electrodes are mounted on the surface of said optical device mounting board and are divided by grooves having an exposed upper surface, said grooves dividing the surface of said optical device mounting board; and one or more integrated circuit substrates which have terminals thereon for connecting said divided electrodes with each other, have integrated circuits thereon for controlling said optical devices and are spanning said grooves.

10. The optical device mounting board according to claim 9, wherein said integrated circuit substrates are bonded with said optical device mounting board by solder bumps.

11. The optical device mounting board according to claim 10, wherein optical devices are bonded with said optical device mounting board by using solder bumps of the same material as the material for said solder bumps for bonding said integrated circuit substrates and said optical device mounting board.

12. The optical device mounting board according to claim 10, wherein optical devices are bonded with said optical device mounting board by using solder bumps of the melting point different from that of said solider bumps for bonding said integrated circuit substrates and said optical device mounting board.

13. The optical device mounting board according to claim 10, wherein said solder bumps are manufactured by punching a board made of a material thereof.

14. An optical device mounting board which includes electrodes for connecting optical devices, wherein:

said electrodes are mounted on the surface of said optical device mounting board and are divided by grooves having an exposed upper surface, said grooves dividing the surface of said optical device mounting board; and one or more integrated circuit packages which have pins for connecting said divided electrodes with each other, have integrated circuits therein for controlling said optical devices and are spanning said grooves.

15. The optical device mounting board according to claim 14, wherein said integrated circuit packages are bonded with said optical device mounting board by solder bumps.

16. The optical device mounting board according to claim 15, wherein optical devices are bonded with said optical device mounting board by using solder bumps of the same material as the material for said solder bumps for bonding said integrated circuit packages and said optical device mounting board.

17. The optical device mounting board according to claim 15, wherein optical devices are bonded with said optical device mounting board by using solder bumps of the melting point different from that of said solider bumps for bonding said integrated circuit packages and said optical device mounting board.

18. The optical device mounting board according to claim 15, wherein said solder bumps are manufactured by punching a board made of a material thereof.

* * * * *

UNITED STATES PATENT AND TRADEMARK OFFICE
CERTIFICATE OF CORRECTION

PATENT NO.   : 6,115,515
DATED        : September 5, 2000
INVENTOR(S)  : Masataka ITOH et al.

It is certified that error appears in the above-indentified patent and that said Letters Patent is hereby corrected as shown below:

On the title page, in Item [30], change "Sep. 19, 1907" to --Sep. 19, 1997--.

Signed and Sealed this

Eighth Day of May, 2001

Attest:

NICHOLAS P. GODICI

Attesting Officer      Acting Director of the United States Patent and Trademark Office